United States Patent [19]

Igarashi et al.

[11] Patent Number: 5,016,675
[45] Date of Patent: May 21, 1991

[54] REFRIGERANT TRANSPORTING HOSE

[75] Inventors: Ichiro Igarashi, Komaki; Hiroaki Ito, Kasugai, both of Japan

[73] Assignee: Tokai Rubber Industries, Ltd., Aichi, Japan

[21] Appl. No.: 421,758

[22] Filed: Oct. 16, 1989

[30] Foreign Application Priority Data

Oct. 18, 1988 [JP] Japan .................. 63-262054

[51] Int. Cl.$^5$ .............................. F16L 11/12
[52] U.S. Cl. .................. 138/125; 138/137; 138/DIG. 4
[58] Field of Search ............ 138/123, 124, 125, 126, 138/137, 172, 174, DIG. 3, 140, 141, DIG. 4; 428/35.7, 36.1, 36.2, 36.6, 36.9, 36.91

[56] References Cited

U.S. PATENT DOCUMENTS

| | | | |
|---|---|---|---|
| 3,062,241 | 11/1962 | Brumbach | 138/125 |
| 3,762,986 | 10/1973 | Rhuta et al. | 138/141 |
| 4,410,661 | 10/1983 | Epstein et al. | 138/118 |
| 4,510,974 | 4/1985 | Natori et al. | 138/125 |
| 4,842,024 | 6/1989 | Palinchak | 138/125 |
| 4,862,923 | 9/1989 | Kitami | 138/137 |
| 4,881,576 | 11/1989 | Kitami | 138/125 |
| 4,905,736 | 3/1990 | Kitami et al. | 138/137 |

Primary Examiner—James E. Bryant, III
Attorney, Agent, or Firm—Oliff & Berridge

[57] ABSTRACT

A refrigerant transporting hose having an inner tube, an outer tube located radially outwardly of the inner tube, and a reinforcing fiber layer interposed between the inner and outer tubes, such that the reinforcing fiber layer and the inner and outer tubes constitute an integral tubular body, the inner tube including a resinous layer formed of a composition containing as a major constituent thereof a blend of at least one aliphatic polyamide and at least one aromatic polyamide.

14 Claims, 1 Drawing Sheet

REFRIGERANT TRANSPORTING HOSE

BACKGROUND OF THE INVENTION

1. Field of the Invention

The present invention relates in general to a refrigerant transporting hose, and in particular to such hoses suitable for use as pipings of car coolers, air conditioners and the like which are employed in automotive vehicles.

2. Discussion of the Prior Art

There is known a hose for transporting a refrigerant such as freon (fluorohydrocarbon and chlorofluorohydrocarbon). The hose has an integral multi-layer construction consisting of an inner tube, an outer tube located radially outwardly of the inner tube, and a reinforcing fiber layer interposed between the inner and outer tubes. The inner tube is formed of acrylonitrilebutadiene rubber (NBR) or chlorosulphonated polyethylene (CSM), while the reinforcing fiber layer has a mesh structure formed by braiding organic yarn such as polyester fiber, rayon fiber, nylon fiber, etc. Meanwhile, the outer tube is formed of ethylene propylene diene rubber (EPDM) or chloroprene rubber (CR).

Being formed of rubber except for the reinforcing layer, the multi-layer hose has a high flexibility. Due to this characteristic, the hose can be handled with ease, for example in providing rubber piping. In addition, the hose is free from deterioration due to harmful metallic substances such as metallic ions and/or metal chlorides originating from metallic piping used in a refrigerant or coolant circulation system.

However, rubber materials generally have a comparatively high gas permeability, that is, low resistance to gas permeation therethrough. Accordingly, the conventional rubber hose suffers from the problem that the refrigerant (e.g. freon) circulating therein leaks through the wall thereof into ambient atmosphere, so that the refrigerant is progressively reduced in amount. In other words, the refrigerating or cooling capability of a system employing the rubber hose is comparatively rapidly lowered during a period of service, and gas charging (charging of refrigerant) must be conducted frequently to maintain satisfactory performance of the system. Meanwhile, nowadays there is an environmental problem that flon adversely affects the ozone layer of the earth atmosphere. Thus, it is a great demand for a refrigerant transporting hose having improved resistance to gas permeation therethrough. The conventional rubber-based hose exhibits excellent flexibility and excellent resistance to harmful metallic substances, but is unsatisfactory in resistance to permeation therethrough of refrigerant.

In the above-indicated situation it has been proposed to provide a hose the inner tube of which includes a layer formed of a resin having high resistance to refrigerant permeation. Polyamide such as nylon 6, nylon 66, or copolymer of nylon 6 and nylon 66 is used for forming the resinous layer. Such a hose has improved resistance to refrigerant permeation, but is unsatisfactory in flexibility and resistance to harmful metallic substances. Accordingly, this hose is not suitable for practical use. Since the polyamide is very effective against refrigerant permeation, it is possible to reduce the thickness of the resinous layer to a considerable extent. Even in this case, however, the hose is low in flexibility as compared with the conventional rubber hose.

Furthermore, in the case where other polyamides such as nylon 11 and nylon 12 are used for forming provide a layer of an inner tube of a hose, the hose produced has a high resistance to harmful metallic substances, but is lower in resistance to refrigerant permeation than the hose having a layer formed of the previously-indicated polyamide such as nylon 6 or nylon 66. Consequently, the layer formed of nylon 11 or nylon 12 must be thickened as such, to have a comparable resistance to refrigerant permeation. The hose having the thickened resinous layer suffers from an extremely reduced flexibility, and is not suitable for practical use.

As emerges from the foregoing, none of the conventional refrigerant transporting hoses is satisfactory in quality, in particular in view of recent great demand for hoses having more excellent resistance to refrigerant permeation therethrough.

SUMMARY OF THE INVENTION

It is therefore an object of the present invention to provide a refrigerant transporting hose having high resistance to permeation therethrough of refrigerant, in addition to high flexibility and high resistance to harmful metallic substances such as metallic ions and metal chlorides.

The above object has been achieved by the present invention, which provides a refrigerant transporting hose comprising an inner tube, an outer tube located radially outwardly of the inner tube, and a reinforcing fiber layer interposed between the inner and outer tubes, such that the reinforcing fiber layer and the inner and outer tubes constitute an integral tubular body, the inner tube including a resinous layer formed of a composition containing as a major constituent thereof a blend of at least one aliphatic polyamide and at least one aromatic polyamide.

In the refrigerant transporting hose constructed as described above, a composition containing as a major constituent a blend of at least one aliphatic polyamide and at least one aromatic polyamide, is used for forming a layer of an inner tube thereof. Since the polyamides blend has excellent resistance to refrigerant permeation, the hose effectively resists the refrigerant permeation therethrough. Consequently, a refrigerant or coolant circulation system employing the present hose maintains its function without frequent gas chargings. Additionally, the present refrigerant transporting hose will serve as a measure to solve the environmental problem caused by Freon.

Furthermore, the above-indicated polyamides blend is a material yielding a satisfactory flexibility and sufficiently resistant to metallic ions and/or metal chlorides originating from metallic piping used in a refrigerant or coolant circulation system. Therefore, the present hose is easily handled in providing piping, and additionally has an excellent durability.

According to a feature of the present invention, the inner tube further includes an outer layer of a rubber material located radially outwardly of the resinous layer. In this case, the flexibility of the hose is advantageously improved. This hose has a simple construction, and is manufactured at comparatively low cost.

According to another feature of the present invention, the inner tube has a three-layer structure consisting of the resinous layer, and an inner and an outer layer each formed of a rubber material which are located radially inwardly and outwardly of the resinous layer, respectively. This hose is advantageously connected at both ends thereof to nipples or other sorts of joints with satisfactory fluid-tightness, namely good seal therebetween.

According to yet another feature of the present invention, the composition contains a rubber constituent in addition to the above-indicated polyamides blend. The layer formed of this composition is advantageously improved in flexibility.

BRIEF DESCRIPTION OF THE DRAWINGS

The above and optional objects, features and advantages of the present invention will be better understood by reading the following detailed description of the present invention, in conjunction with the accompanying drawings in which.

DETAILED DESCRIPTION OF THE INVENTION

Figure 1:
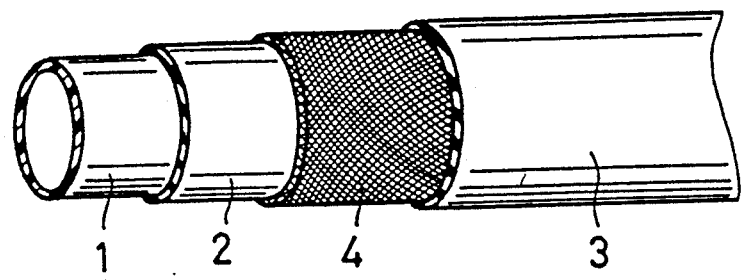
FIGS. 1 and 2 are perspective views of two embodiments of a refrigerant transporting hose of the present invention, respectively.

In the present invention, a composition including as a major constituent thereof a blend of at least one aliphatic polyamide and at least one aromatic polyamide, is used for forming a layer of an inner tube of a refrigerant transporting hose. The aliphatic polyamide has a molecular structure consisting essentially of aliphatic hydrocarbon groups and amido bonding groups (—CONH—). The aliphatic polyamide is selected from a ring-opening-polymerization product of at least one lactam, a condensation polymerization product of at least one w-amino acid, and a condensation polymerization product of at least one aliphatic dicarboxylic acid and at least one aliphatic diamine, and any blend of these products. The lactam is preferably selected from δ-caprolactam, enanthlactam, capryllactam, lauryllactam, butyrolactam, and γ-valerolactam. The ω-amino acid is preferably selected from 6-aminocaproic acid, 7-aminoheptanoic acid, 9-aminononanoic acid, and 11-aminoundecanoic acid. The aliphatic dicarboxylic acid is preferably selected from malonic acid, succinic acid, glutaric acid, adipic acid, sebacic acid, undecanedicarboxylic acid, dodecanedicarboxylic acid, tridecanedicarboxylic acid, tetradecanedicarboxylic acid, hexadecanedicarboxylic acid, hexadecenedicarboxylic acid, octadecanedicarboxylic acid, octadecenedicarboxylic acid, eicosanedicarboxylic acid, and eicosenedicarboxylic acid. The aliphatic diamine is preferably selected from ethylene diamine, trimethylene diamine, tetramethylene diamine, pentamethylene diamine, hexamethylene diamine, heptamethylene diamine, octamethylene diamine, nonamethylene diamine, decamethylene diamine, undecamethylene diamine, dodecamethylene diamine, tridecamethylene diamine, hexadecamethylene diamine, octadecamethylene diamine, 2, 2, 4-trimethylhexamethylene diamine, and 2, 4, 4-trimethylhexamethylene diamine.

The aromatic polyamide used to prepare the polyamides blend has a molecular chain containing at least one aromatic ring. The aromatic polyamide is selected from a condensation polymerization product of at least one aromatic dicarboxylic acid and at least one aliphatic diamine, and a condensation polymerization product of at least one aliphatic dicarboxylic acid and at least one aromatic diamine, and any blend of these products. The aliphatic dicarboxylic acid or the aliphatic diamine used as a monomer to prepare the aromatic polyamide, is preferably selected from the above-indicated dicarboxylic acids or diamines, respectively, which are used to prepare the aliphatic polyamide. Meanwhile, the aromatic dicarboxylic acid is preferably selected from terephthalic acid, isophthalic acid, and phthalic acid. As the aromatic diamine is used xylylene diamine, for example.

The ratio of the aliphatic polyamide to aromatic polyamide in the polyamides blend, and the selection of monomer or monomers used to prepare each of the aliphatic and aromatic polyamides may be altered depending upon the specified resistance to refrigerant permeation, specified resistance to harmful metallic substances, and specified flexibility which the hose to be produced is required to have. It is generally recommended that the ratio by weight of the aliphatic polyamide to the aromatic polyamide fall within a range of 90/10 to 30/70. If the amount of the aromatic polyamide relative to the amount of the aliphatic polyamide is below the lower limit, 10/90, the hose produced is unsatisfactory in resistance to refrigerant permeation and resistance to harmful metallic substances. Meanwhile, if the amount of the aromatic polyamide exceeds the upper limit, 70/30, the hose produced is resistant to refrigerant permeation and harmful metallic substances, but becomes unsatisfactory in flexibility. Concerning the selection of monomer or monomers, a longer-chain lactam, amino acid, dicarboxylic acid and/or diamine are preferably employed for producing hoses having improved flexibility and improved resistance to harmful metallic substances, in particular.

A blend of aliphatic polyamide and aromatic polyamide is prepared by mixing the polyamides into a uniform mixture by a known technique. For example, pellets of aliphatic and aromatic polyamides first are dry blended and subsequently are kneaded by a single or double screw extruder.

In the present invention, the composition, used for forming a single-layer inner tube of a hose or one layer of a multi-layer inner tube of a hose, contains the polyamides blend as a major constituent. Accordingly, the composition may further contain a rubber constituent (rubber material) which yields elasticity. The resinous layer formed of this composition has a higher flexibility than the resinous layer formed of the composition consisting of the polyamides blend alone. The rubber is preferably selected from ethylene propylene diene rubber (EPDM), chlorinated polyethylene (CPE), chlorinated isobutylene-isoprene rubber (Cl-IIR), and epichlorohydrin rubber (CHC, CHR). It is recommended that the ratio by weight of the polyamides blend to the rubber constituent fall within the range of 100/0 to 50/50. If the amount of the rubber relative to the amount of the polyamides blend exceeds the upper limit, 50/50, the resinous layer formed has improved flexibility, but becomes unsatisfactory in resistance to refrigerant permeation. A composition containing a polyamides blend and a rubber constituent may be prepared by kneading using the above-indicated extruder or the like. A vulcanizing agent for the rubber constituent, and/or other known additives may further be added to this composition, as needed.

The thickness of the resinous layer formed of the composition containing the polyamides blend, is selected depending upon requirements on the flexibility and refrigerant-permeation resistance of the hose to be produced. It is generally recommended that the thickness of the resinous layer fall within the range of 0.05 to 1.0 mm. If the thickness of the resinous layer is below the lower limit, 0.05 mm, the hose produced is insufficient in resistance to refrigerant permeation, and insufficient in durability due to the weakness of the thin resinous layer. Meanwhile, if the thickness exceeds the upper limit, 1.0 mm, the hose produced exhibits improved resistance to refrigerant permeation, but loses its excellent flexibility, namely becomes more rigid.

As previously described, the composition prepared according to the present invention may be used for forming one layer of a multi-layer inner tube of a hose, as well as a single-layer inner tube of a hose. Referring to FIG. 1 there is shown a preferred embodiment of the refrigerant transporting hose of the present invention, wherein the inner tube thereof has a double-layer structure consisting of an inner layer 1 and an outer layer 2 located radially outwardly of the inner layer 1. The inner layer 1 is formed of the composition containing as a major component the polyamides blend, and serves as the innermost layer of the hose. A reinforcing fiber layer 4 is located radially outwardly of the outer layer 2 of the inner tube, and an outer tube 3 of a suitable thickness is provided radially outwardly of the reinforcing fiber layer 4. The outer layer 2 of the inner tube is formed of a rubber material and has rubber elasticity, so that the outer layer 2 elastically supports the inner resinous layer 1 of the inner tube. Due to the rubber elasticity of the outer layer 2 the hose has more excellent flexibility. This hose has a simple construction and is manufactured at low cost.

The rubber material used for forming the outer layer 2 of the inner tube of the hose may be selected from known rubber materials as used for providing inner tubes of conventional rubber hoses; such as NBR and CSM. Other rubbers such as EPDM, C(-IIR, CPE, CHC, and CHR may be used for forming the outer layer 2.

The reinforcing fiber layer 4 may be formed by a known technique as used in producing conventional rubber hoses. For example, the fiber layer 4 is provided by braiding, spiraling or knitting of yarn essentially consisting of synthetic fiber such as polyester fiber or aramid fiber.

The outer tube 3, serving as the outermost layer of the hose, provides the weather resistance, heat resistance, water-permeation resistance, and other characteristics of the hose. In view of this it is recommended that the outer tube 3 be formed of a rubber material such as EPDM or Cl-IIR. However, other rubber materials may be used for forming the outer tube 3.

Figure 2:
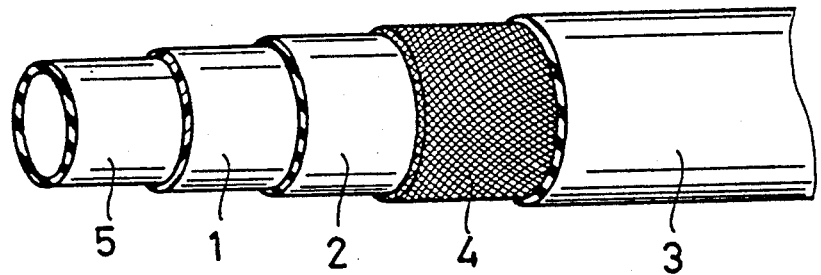

Referring next to FIG. 2 there is shown another embodiment of the invention, wherein the inner tube thereof has a three-layer structure consisting of a resinous layer 1, an outer layer 2, and an inner layer 5. The inner layer 5, having a suitable thickness, is located radially inwardly of the resinous layer 1, which corresponds to the innermost layer 1 of the embodiment of FIG. 1, and accordingly serves as the innermost layer of the instant hose. The inner layer 5 is formed of a rubber material similar to that of the outer layer 2, which corresponds to the outer layer 2 of the embodiment of FIG. 1. Therefore, the inner layer 5 has rubber elasticity. The instant hose is connected at both ends thereof to nipples or other sorts of joints with high fluid-tightness, namely improved seal with respect thereto.

As is apparent from the above description of the preferred embodiments, the multi-layer structure of the inner tube of the refrigerant transporting hose may be modified depending upon its applications, so as to achieve different advantages with the modified constructions.

In the embodiments of FIGS. 1 and 2, the thickness of each of the outer layer 2, outer tube 3 and inner layer 5 is selected depending upon various parameters such as the sort of the rubber material used, the diameter of the hose to be produced, and the overall thickness of the wall of the hose. For practical use it is generally recommended that the thickness of the outer layer 2 of the inner tube fall within the range of 1 to 3 mm. If the outer layer 2 is excessively thin, the hose produced is easily bent, but tends to be folded back in two parts and thereby suffer from a kink. Meanwhile, if the outer layer 2 is excessively thick, the hose is protected against a kink, but becomes excessively rigid. The thickness of the outer tube 3 preferably falls within the range of 1 to 3.5 mm, in view of resistance to water permeation. The thickness of the inner layer 5 of the inner tube preferably falls within the range of 0.5 to 2.0 mm.

There will be described a process of manufacturing a refrigerant transporting hose having the above-indicated multi-layer construction.

(a) First, an inner tube (1, 2, 5) having a single-layer structure or a multi-layer structure is formed by extrusion on a rubber or resin mandrel. Where an inner tube consisting of a plurality of layers is formed, the extruding operation may be conducted in a plurality of steps each for forming a corresponding one of a resinous layer (1) and rubber layer or layers (2, 5) by using a resinous composition and rubber composition or compositions, respectively. Alternatively, the extruding operation may be conducted all in one step by concurrently extruding the resinous and rubber compositions on the mandrel. In either case, the inner tube having the multi-layer structure as shown in FIG. 1 or 2, is obtained. Adhesive may be applied to an interface between layers, as needed, during the extruding operation.

(b) Subsequently, adhesive is applied to the outer circumferential surface of the single-layer or multi-layer inner tube, as needed. Then, a reinforcing fiber layer (4) is formed by braiding, spiraling or knitting yarn of synthetic fiber.

(c) In addition, a suitable adhesive (e.g., rubber dough) is applied to the outer circumferential surface of the reinforcing fiber layer (4), and a rubber composition is extruded to form an outer tube (3) of a predetermined thickness.

(d) The thus-obtained multi-layer tube is vulcanized (and thereby subjected to bridging) to adhere the layers to each other and thereby produce an integral tubular body, namely, a hose as an end product. The vulcanization conditions are preferably such that the vulcanization temperature be selected at 140° C. to 170° C. and that the vulcanization period of time be selected at 30 to 90 minutes.

The thus-produced refrigerant transporting hose has, as the single-layer inner tube or one layer of the multi-layer inner tube thereof, the resinous layer formed of the composition containing as a major component the blend of the specified two sorts of polyamides. Due to the specific characteristics of the composition the hose exhibits high resistance to refrigerant permeation and high resistance to harmful metallic substances, in addition to high flexibility. Thus the present hose is suitably used for providing a car cooler or air conditioner with piping, which is subject to strict requirements recently.

There will be described some examples of the refrigerant transporting hose of the present invention, to illustrate the principle of the invention in more detail. However, it is to be understood that the present invention is by no means limited to the particular details of the examples.

EXAMPLES

In the following description, part(s), ratio or percentage indicates on a weight basis, namely, means part(s) by weight, ratio by weight and percentage by weight, respectively, unless otherwise specified.

Eight invention hoses and four comparative hoses, each of which has the same multi-layer construction as that of the hose of FIG. 1, were manufactured by using respective materials specified in TABLE I-1 and TABLE I-2 respectively. The manufacture of each hose was conducted by the previously described process, for example, by extruding a plurality of layers one of another from inside to outside and thermally vulcanizing the obtained multi-layer tube, thereby producing an integral tubular body, i.e., hose which has an inner diameter of 11.0 mm.

It is noted that nylon 6 and nylon 12 indicated in TABLEs I-1, I-2 are ring-opening-polymerization produces of δ-caprolactam and lauryllactam, respectively, that nylon 11 is a condensation polymerization product of 11-aminoundecanoic acid, and that nylon 612 is a condensation polymerization product of hexamethylene diamine and dodecanedicarboxylic acid.

It is also noted that the rubber materials indicated at NBR, EPDM, Cl-IIR and CHR in TABLEs I-1, I-2 have the following composition:

| Constituents | Parts |
|---|---|
| (1) NBR | |
| NBR (AN = 42%) | 100 |
| FEF carbon black | 60 |
| dioctyl phthalate | 10 |
| ZnO | 5 |
| sulfur | 1 |
| tetramethyl thiuram disulfide | 2 |
| N-cyclohexyl-2-benzothiazyl sulfenamide | 1 |
| (2) EPDM | |
| EPDM polymer | 100 |
| FEF carbon black | 20 |
| talc | 100 |
| paraffinic process oil | 60 |
| dicumyl peroxide | 5 |
| ethyleneglycol dimethacrylate | 3 |
| ZnO | 5 |
| stearic acid | 1 |
| (3) Cl-IIR | |
| Cl-IIR (Cl = 1.0%) | 100 |
| FEF carbon black | 50 |
| paraffinic process oil | 10 |
| ZnO | 5 |
| anti-oxidant | 2 |
| stearic acid | 1 |
| tetramethyl thiuram disulfide | 1 |
| dibenzothiazyl disulfide | 1 |
| (4) CHR | |
| CHR (epichlorohydrin/ethylene oxide = 50/50 mol %) | 100 |
| stearic acid | 1 |
| MgO | 2 |
| FEF carbon black | 50 |
| plasticizer | 5 |
| red lead ($Pb_3O_4$) | 5 |
| 2-mercaptoimidazoline | 1 |
| diphenylguanidine | 0.5 |

TABLE I

| | | | | | INVENTION EXAMPLES | | | | |
|---|---|---|---|---|---|---|---|---|---|
| | HOSE NO. | | | | 1 | 2 | 3 | 4 | 5 |
| HOSE CONSTRUCTION | INNER TUBE | INNER LAYER 1 | COMPOSITION | ALIPHATIC POLYAMIDE (A) | NYLON 11 | NYLON 11 | NYLON 11 | NYLON 12 | NYLON 612 |
| | | | | AROMATIC POLYAMIDE (B) | CONDENSATION POLYMERIZATION PRODUCT OF HEXAMETHYLENE DIAMINE AND TEREPHTHALIC ACID | | | | |
| | | | | RUBBER (C) | NONE | NONE | NONE | NONE | NONE |
| | | | BLEND RATIO (A)/(B)/(C) | | 90/10/0 | 50/50/0 | 30/70/0 | 70/30/0 | 70/30/0 |
| | | | THICKNESS (mm) | | 0.2 | 0.2 | 0.2 | 0.2 | 0.2 |
| | | OUTER LAYER 2 | MATERIAL | | NBR | NBR | NBR | EPDM | EPDM |
| | | | THICKNESS (mm) | | 1.5 | 1.5 | 1.5 | 1.5 | 1.5 |
| REINFORCING FIBER LAYER 4 | | | | | POLYESTER-FIBER YARN | | | | |
| | OUTER TUBE 3 | MATERIAL | | | EPDM | EPDM | EPDM | EPDM | EPDM |
| | | THICKNESS (mm) | | | 1.4 | 1.4 | 1.4 | 1.4 | 1.4 |

| | | | | | INVENTION EXAMPLES | | | COMPARATIVE EXAMPLES | | | |
|---|---|---|---|---|---|---|---|---|---|---|---|
| | HOSE NO. | | | | 6 | 7 | 8 | 9 | 10 | 11 | 12 |
| HOSE CONSTRUCTION | INNER TUBE | INNER LAYER 1 | COMPOSITION | ALIPHATIC POLYAMIDE (A) | NYLON 12 | NYLON 12 | NYLON 12 | — | NYLON 6 | NYLON 11 | NYLON 11 |
| | | | | AROMATIC POLYAMIDE (B) | CONDENSATION POLYMERIZATION PRODUCT OF TRIMETHYLHEXAMETHYLENE DIAMINE AND TEREPHTHALIC ACID | | | — | NONE | NONE | NONE |
| | | | | RUBBER | NONE | Cl-IIR | CHR | — | NONE | NONE | NONE |

TABLE I-continued

| | | | | | | | | | |
|---|---|---|---|---|---|---|---|---|---|
| | | BER (C) BLEND RATIO (A)/(B)/(C) | 70/30/0 | 50/20/30 | 50/20/30 | — | 100/0/0 | 100/0/0 | 100/0/0 |
| | | THICKNESS (mm) | 0.2 | 0.5 | 0.5 | — | 0.08 | 1.0 | 0.2 |
| | OUTER LAYER 2 | MATERIAL | NBR | NBR | NBR | NBR | NBR | NBR | NBR |
| | | THICKNESS (mm) | 1.5 | 1.5 | 1.5 | 1.5 | 1.5 | 1.5 | 1.5 |
| REINFORCING FIBER LAYER 4 | | | POLYESTER-FIBER YARN | | | | POLYESTER-FIBER YARN | | |
| OUTER TUBE 3 | | MATERIAL | EPDM | EPDM | EPDM | EPDM | EPDM | EPDM | EPDM |
| | | THICKNESS (mm) | 1.4 | 1.4 | 1.4 | 1.4 | 1.4 | 1.4 | 1.4 |

The thus-produced twelve examples (invention hoses No. 1-8; comparative hoses No. 9-12) each were tested to evaluate its flexibility, resistance to refrigerant permeation, and resistance to harmful metallic substances. The test results are indicated in TABLE II. The three characteristics were evaluated as follows:

checked whether or not the dumbbell has broken. The symbol "0" indicates that the test piece had not broken, while the symbol "X" indicates that the test piece has broken. That a test piece does not break with a higher concentration ZnC( aqueous solution, indicates a higher resistance to harmful metallic substances.

TABLE II

| | | | INVENTION EXAMPLES | | | | | | | | COMPARATIVE EXAMPLES | | | |
|---|---|---|---|---|---|---|---|---|---|---|---|---|---|---|
| HOSE NO. | | | 1 | 2 | 3 | 4 | 5 | 6 | 7 | 8 | 9 | 10 | 11 | 12 |
| HOSE CHARAC- TERISTICS | RESISTANCE TO REFRIGERANT PERMEATION (g/m/72 hr) | | 8 | 6 | 5 | 6 | 4 | 6 | 6 | 7 | 28 | 2 | 5 | 22 |
| | RESISTANCE TO HARMFUL METALIC SUBSTANCES | CONCENTRA- TION OF ZINC CHLORIDE | | | | | | | | | | | | |
| | | 5% | O*1 | O | O | O | O | O | O | O | O | X*2 | O | O |
| | | 10% | O | O | O | O | O | O | O | O | O | X | O | O |
| | | 20% | O | X | O | X | O | O | O | O | O | X | O | O |
| | FLEXI- BILITY (kgf) | 300 mm | 1.4 | 1.5 | 1.5 | 1.5 | 1.5 | 1.5 | 1.7 | 1.7 | 1.3 | 1.2 | 3.0 | 1.4 |
| | | 400 mm | 0.7 | 0.7 | 0.8 | 0.7 | 0.8 | 0.8 | 0.9 | 0.9 | 0.6 | 0.6 | 1.7 | 0.7 |

O*1: The test piece did not break.
X*2: The test piece broke.

FLEXIBILITY

Each hose, having an inner diameter of 11.0 mm, was cut into a 300 mm and a 400 mm long test piece. Each test piece was fixed at one of opposite ends thereof to a horizontal plate, and was bent with the other end subjected to force. A value of the applied force at which the other end of the hose reached the horizontal plate, was measured as a bending stress of the test piece. A lower bending stress means a higher flexibility of a hose.

RESISTANCE TO REFRIGERANT PERMEATION

Each hose was cut into a 500 mm long test piece, and the test piece was charged with 40 g of flon 12 (R12) and gas-tightly sealed at opposite ends thereof. The Freon charged test piece was kept for 72 hours. After the 72 hours, an overall weight of the test piece was measured, and the measured value was compared with a value measured before the 72 hours. Thus, a weight of the lost part of the charged Freon which part had permeated away to ambient atmosphere through the wall of the hose, was determined. A less amount of lost flon means a higher resistance to refrigerant permeation therethrough.

RESISTANCE TO HARMFUL METALLIC SUBSTANCES

Each test piece in the form of a dumbbell (No. 3) was obtained bY punching an inner tube formed by extrusion on a mandrel. The dumbbell was extended by 10%, and immediately an aqueous solution of zinc chloride (ZnCl) in different concentrations was dropped onto the dumbbell. Subsequently the dumbbell was kept in a oven at 120° C. for 2 hours. After the 2 hours it was The test results indicated in TABLE II demonstrates that the invention hoses No. 1-8, each having the resinous layer (1) formed of the composition containing as a major component the blend of the specified two sorts of polyamides, is satisfactory all in flexibility, resistance to refrigerant permeation, and resistance to harmful metallic substances.

In contrast thereto, the comparative hose No. 9, not provided with a resinous layer, exhibited satisfactory flexibility and satisfactory resistance to harmful metallic substances, but was unsatisfactory in resistance to refrigerant permeation. Furthermore, in the case of the comparative hoses No. 10, 11 and 12 wherein each resinous layer is formed of aliphatic polyamide alone, the resistance to harmful metallic substances was unsatisfactory (No. 10), the flexibility was unsatisfactory (No. 11), or the resistance to refrigerant permeation was unsatisfactory (No. 12).

While the present invention has been described in detail with particularities, it is to be understood that the invention is not limited to the details of the illustrated embodiments or examples, but may be embodied with various changes, improvements and modifications, which may occur to those skilled in the ar, without departing from the spirit and scope of the invention defined in the appended claims.

What is claimed is:

1. A refrigerant transporting hose comprising:
    an inner tube;
    an outer tube located radially outwardly of said inner tube; and
    a reinforcing fiber layer interposed between said inner and outer tubes, such that said reinforcing fiber layer and the inner and outer tubes constitute an integral tubular body;

said inner tube including a resinous layer formed of a composition containing as a major constituent thereof a blend of at least one aliphatic polyamide and at least one aromatic polyamide, said resinous layer having a thickness of 0.05 to 1.0 mm.

2. The hose as set forth in claim 1, wherein said inner tube further includes an outer layer of a rubber material located radially outwardly of said resinous layer.

3. The hose as set forth in claim 2, wherein said inner tube further includes an inner layer of a rubber material located radially inwardly of said resinous layer.

4. The hose as set forth in claim 1, wherein said composition further contains a rubber constituent, a proportion of said rubber constituent being up to 50 parts by weight in 100 parts by weight of the polyamides blend.

5. The hose as set forth in claim 1, wherein said at least one aliphatic polyamide is selected from the group consisting of a ring-opening-polymerization product of at least one lactam, a condensation polymerization product of at least one ω-amino acid, and a condensation polymerization product of at least one aliphatic dicarboxylic acid and at least one aliphatic diamine, and any blend of said products.

6. The hose as set forth in claim 1, wherein said at least one aliphatic polyamide is a ring-opening-polymerization product of at least one lactam selected from the group consisting of γ-caprolactam, enanthlactam, capryllactam, lauryllactam, butyrolactam, and δ-valerolactam.

7. The hose as set forth in claim 1, wherein said at least one aliphatic polyamide is a condensation polymerization product of at least one ω-amino acid selected from the group consisting of 6-aminocaproic acid, 7-aminoheptanoic acid, 9-aminononanoic acid, and 11-aminoundecanoic acid.

8. The hose as set forth in claim 1, wherein said at least one aliphatic polyamide is a condensation polymerization product of at least one aliphatic dicarboxylic acid and at least one aliphatic diamine, said at least one aliphatic dicarboxylic acid being selected from the group consisting of malonic acid, succinic acid, glutaric acid, adipic acid, sebacic acid, undecanedicarboxylic acid, dodecanedicarboxylic acid, tridecanedicarboxylic acid, tetradecanedicarboxylic acid, hexadecanedicarboxylic acid, hexadecenedicarboxylic acid, octadecanedicarboxylic acid, octadenedicarboxylic acid, eicosanedicarboxylic acid, and eicosenedicarboxylic acid.

9. The hose as set forth in claim 1, wherein said at least one aliphatic polyamide is a condensation polymerization product of at least one aliphatic dicarboxylic acid and at least one aliphatic diamine, said at least one aliphatic diamine being selected from the group consisting of ethylene diamine, trimethylene diamine, tetramethylene diamine, pentamethylene diamine, hexamethylene diamine, heptamethylene diamine, octamethylene diamine, nonamethylene diamine decamethylene diamine, undecamethylene diamine, dodecamethylene diamine, tridecamethylene diamine, hexadecamethylene diamine, octadecamethylene diamine 2,2,4-trimethylhexamethylene diamine, and 2,4,4-trimethylhexamethylene diamine.

10. The hose as set forth in claim 1, wherein said at least one aromatic polyamide is selected from the group consisting of a condensation polymerization product of at least one aromatic dicarboxylic acid and at least one aliphatic diamine, and a condensation polymerization product of at least one aliphatic dicarboxylic acid and at least one aromatic diamine, and any blend of said products.

11. The hose as set forth in claim 1, wherein said at least one aromatic polyamide is a condensation polymerization product of at least one aromatic dicarboxylic acid and at least one aliphatic amine, said at least one dicarboxylic acid being selected from the group consisting of terephthalic acid, isophthalic acid, and phthalic acid.

12. The hose as set forth in 1, wherein said at least one aromatic polyamide is a condensation polymerization product of at least one aliphatic carboxylic acid and xylylene diamine.

13. The hose as set forth in claim 1, wherein a ratio by weight of said at least one aliphatic polyamide to said at least one aromatic polyamide falls within a range of 90/10 to 30/70.

14. The hose as set forth in claim 1, wherein said outer tube is formed of a rubber material, and has a thickness of 1 to 3.5 mm.

* * * * *